United States Patent
Zhang et al.

(10) Patent No.: US 11,380,089 B1
(45) Date of Patent: Jul. 5, 2022

(54) ALL-WEATHER TARGET DETECTION METHOD BASED ON VISION AND MILLIMETER WAVE FUSION

(71) Applicant: Tsinghua University, Beijing (CN)

(72) Inventors: Xinyu Zhang, Beijing (CN); Jun Li, Beijing (CN); Zhiwei Li, Beijing (CN); Huaping Liu, Beijing (CN); Xingang Wu, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 17/543,777

(22) Filed: Dec. 7, 2021

(30) Foreign Application Priority Data

Dec. 29, 2020 (CN) .......................... 202011595732.1

(51) Int. Cl.
*G06V 10/80* (2022.01)
*G06V 10/77* (2022.01)
(Continued)

(52) U.S. Cl.
CPC ............ *G06V 10/806* (2022.01); *G01S 7/412* (2013.01); *G01S 13/867* (2013.01); *G01S 13/89* (2013.01);
(Continued)

(58) Field of Classification Search
CPC ........ G01S 7/412; G01S 13/867; G01S 13/89; G01S 13/931; G06V 10/7715;
(Continued)

(56) References Cited

U.S. PATENT DOCUMENTS 11,210,801 B1 * 12/2021 Zhang ................. G06K 9/6226
2019/0138007 A1 * 5/2019 Baghsorkhi .......... G05D 1/0278
(Continued)

FOREIGN PATENT DOCUMENTS

CN 107862287 A 3/2018
CN 108805906 A 11/2018
(Continued)

OTHER PUBLICATIONS

Lei, Xianmei. Object Detection for Perceptually-Degraded Environments. Diss. California State Polytechnic University, Pomona, 2020. (Year: 2020).*
(Continued)

*Primary Examiner* — Katrina R Fujita
(74) *Attorney, Agent, or Firm* — Bayramoglu Law Offices LLC

(57) ABSTRACT

An all-weather target detection method based on a vision and millimeter wave fusion includes: simultaneously acquiring continuous image data and point cloud data using two types of sensors of a vehicle-mounted camera and a millimeter wave radar; pre-processing the image data and point cloud data; fusing the pre-processed image data and point cloud data by using a pre-established fusion model, and outputting a fused feature map; and inputting the fused feature map into a YOLOv5 detection network for detection, and outputting a target detection result by non-maximum suppression. The method fully fuses millimeter wave radar echo intensity and distance information with the vehicle-mounted camera images. It analyzes different features of a millimeter wave radar point cloud and fuses the features with image information by using different feature extraction structures and ways, so that the advantages of the two types of sensor data complement each other.

12 Claims, 1 Drawing Sheet

(51) Int. Cl.
  *G06V 10/774* (2022.01)
  *G01S 7/41* (2006.01)
  *G06V 10/82* (2022.01)
  *G01S 13/86* (2006.01)
  *G01S 13/931* (2020.01)
  *G01S 13/89* (2006.01)
  *G06V 20/56* (2022.01)

(52) U.S. Cl.
  CPC .......... *G01S 13/931* (2013.01); *G06V 10/774* (2022.01); *G06V 10/7715* (2022.01); *G06V 10/803* (2022.01); *G06V 10/82* (2022.01); *G06V 20/56* (2022.01)

(58) Field of Classification Search
  CPC .. G06V 10/774; G06V 10/803; G06V 10/806; G06V 10/82; G06V 20/56
  See application file for complete search history.

(56) References Cited

U.S. PATENT DOCUMENTS

| | | | |
|---|---|---|---|
| 2019/0180467 A1* | 6/2019 | Li | G01S 17/931 |
| 2019/0265714 A1* | 8/2019 | Ball | G06N 3/0454 |
| 2021/0397907 A1* | 12/2021 | Derbisz | G06V 20/56 |

FOREIGN PATENT DOCUMENTS

| | | | |
|---|---|---|---|
| CN | 111178116 A | | 5/2020 |
| CN | 111898651 A | | 11/2020 |
| CN | 111951306 A | | 11/2020 |
| CN | 113705478 A | * | 11/2021 |
| WO | 2019191380 A1 | | 10/2019 |

OTHER PUBLICATIONS

Marshall et al. "3-D object tracking in panoramic video and LiDAR for radiological source-object attribution and improved source detection." IEEE Transactions on Nuclear Science 68.2 (Dec. 28, 2020): 189-202. (Year: 2020).*

Shen et al. "An Optimized Multi-sensor Fused Object Detection Method for Intelligent Vehicles." 2020 IEEE 5th International Conference on Intelligent Transportation Engineering (ICITE). IEEE, Sep. 2020. (Year: 2020).*

Wang et al. "Deep learning based target detection algorithm for motion capture applications." Journal of Physics: Conference Series. vol. 1682. No. 1. IOP Publishing, Sep. 2020. (Year: 2020).*

Wang, Lei. Visual Object Detection for Tree Leaves Based on Deep Learning. Diss. Auckland University of Technology, 2020. (Year: 2020).*

Zhu et al. "Mme-yolo: Multi-sensor multi-level enhanced yolo for robust vehicle detection in traffic surveillance." Sensors 21.1 (Dec. 23, 2020): 27. (Year: 2020).*

* cited by examiner

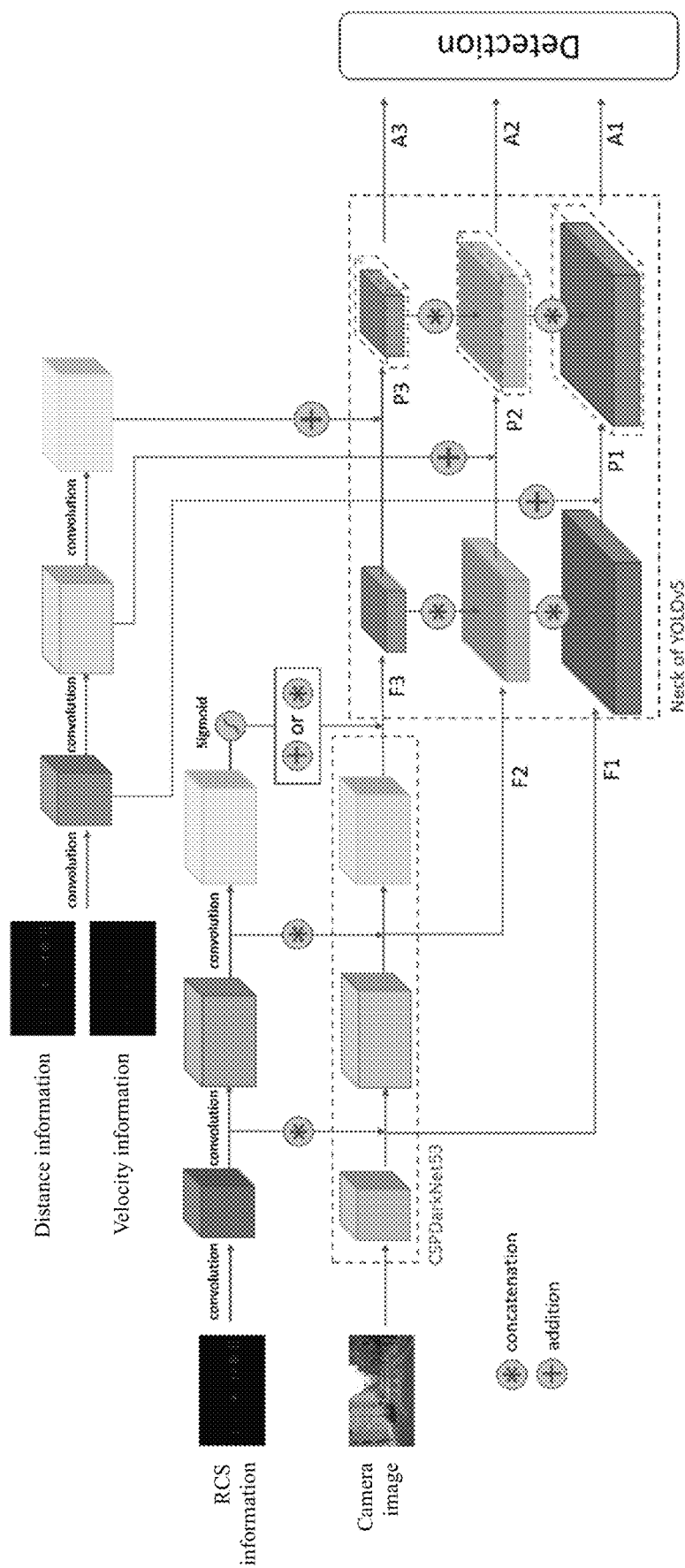

ALL-WEATHER TARGET DETECTION METHOD BASED ON VISION AND MILLIMETER WAVE FUSION

CROSS REFERENCE TO THE RELATED APPLICATIONS

This application is based upon and claims priority to Chinese Patent Application No. 202011595732.1, filed on Dec. 29, 2020, the entire contents of which are incorporated herein by reference.

TECHNICAL FIELD

The present invention relates to the field of autonomous driving technology, and in particular to an all-weather target detection method based on vision and millimeter wave fusion.

BACKGROUND

In recent years, development in the field of driverless technology is very rapid, and automobiles achieve basic functions of autonomous driving such as lane line detection, pedestrian detection, and collision detection based on environmental perception by sensors such as LiDAR, cameras, millimeter wave radars, and wheel speed odometers. With the environmental perception, road information can be fed back to the automobiles to correct the control of driving behavior, thereby improving driving safety and comfort.

A mainstream method of environmental perception of an autonomous vehicle uses camera images for perception, but cameras, like humans, have very limited ability to perceive the environment in complex scenes such as strong light, fog, and night. To achieve autonomous driving, stable environmental perception must be achieved in complex scenes, so scholars usually add different sensors for fusion perception, wherein millimeter wave band electromagnetic waves of millimeter wave radars are not affected by common environmental factors such as rain, fog, and dust, and they can work smoothly in these scenes, and the advantage of low prices of cameras and millimeter wave radars makes it very easy to deploy vehicle perception systems based on vision and millimeter wave radar fusion commercially on a large scale.

Millimeter wave radar feedback data contains distance, velocity, direction, reflection intensity and other information, which can be used for simple perception of a scene. However, combining all the information for fusion perception is not easy, and the intrinsic clutter and data sparsity problems of millimeter waves have a huge influence on the target detection capability.

SUMMARY

The present invention aims to overcome the shortcomings of the prior art and provides an all-weather target detection method based on vision and millimeter wave fusion. In this method, millimeter wave data is first complemented based on continuous frames in data pre-processing, and then RCS (scattering cross-section intensity), distance information and velocity information are used in combination for fusion with visual information in different ways, and target detection is performed to improve detection precision and robustness in complex scenes with strong light or heavy fog, at night, or the like.

To achieve the above object, Embodiment 1 of the present invention provides an all-weather target detection method based on vision and millimeter wave fusion, the method including:

simultaneously acquiring continuous image data and point cloud data using two types of sensors of a vehicle-mounted camera and a millimeter wave radar;

pre-processing the image data and point cloud data;

fusing the pre-processed image data and point cloud data by using a pre-established fusion model, and outputting a fused feature map; and inputting the fused feature map into a YOLOv5 detection network for detection, and outputting a target detection result by non-maximum suppression.

As an improvement of the above method, the method further includes: performing coordinate system calibration on coordinate systems of the two types of sensors.

As an improvement of the above method, pre-processing the image data and point cloud data specifically includes: complementing the point cloud data of the millimeter wave radar; and complementing the image data of the vehicle-mounted camera.

As an improvement of the above method, the fusion model includes a feature extraction module and a feature fusion module;

the feature extraction module includes a first feature extraction channel, a second feature extraction channel and three feature stitching units; the first feature extraction channel extracts features from scattering cross-section intensity information of a radar point cloud by using three sequentially connected convolution units; and the second feature extraction channel extracts features from the image data by using CSPDarkNet53 including three convolution units;

a first convolution unit of the first feature extraction channel processes the scattering cross-section intensity information of the point cloud data to obtain a first RCS feature and outputs the first RCS feature to a first stitching unit; a first convolution unit of the CSPDarkNet53 processes the image data to obtain a first visual feature and outputs the first visual feature to the first stitching unit; the first stitching unit stitches the first RCS feature and the first visual feature to generate a fused feature map F1 and outputs the same to the feature fusion module;

a second convolution unit of the first feature extraction channel processes the first RCS feature to obtain a second RCS feature and outputs the second RCS feature to a second stitching unit; a second convolution unit of the CSPDarkNet53 processes the first visual feature to obtain a second visual feature and outputs the second visual feature to the second stitching unit; the second stitching unit stitches the second RCS feature and the second visual feature to generate a fused feature map F2 and outputs the same to the feature fusion module;

a third convolution unit of the first feature extraction channel processes the second RCS feature to obtain a third RCS feature and outputs the third RCS feature to a third stitching unit; a third convolution unit of the CSPDarkNet53 processes the second visual feature to obtain a third visual feature and outputs the third visual feature to a third stitching unit; the third stitching unit processes the third RCS feature and the third visual feature to generate a fused feature map F3 and outputs the same to the feature fusion module;

the feature fusion module includes a third feature extraction channel, three fusion units and a PANet structure; the third feature extraction channel uses three sequentially connected convolution units;

a first convolution unit of the third feature extraction channel processes distance information and velocity information of the point cloud data to obtain a first point cloud feature and outputs the first point cloud feature to a first fusion unit; the first fusion unit performs pixel-level superimposition on the first point cloud feature and the fused feature map F1 to generate a fused feature map P1 and outputs the same to the PANet structure;

a second convolution unit of the third feature extraction channel processes the first point cloud feature to obtain a second point cloud feature and outputs the second point cloud feature to a second fusion unit; the second fusion unit performs pixel-level superimposition on the second point cloud feature and the fused feature map F2 to generate a fused feature map P2 and outputs the same to the PANet structure;

a third convolution unit of the third feature extraction channel processes the second point cloud feature to obtain a third point cloud feature and outputs the third point cloud feature to a third fusion unit; the third fusion unit performs pixel-level superimposition on the third point cloud feature and the fused feature map F3 to generate a fused feature map P3 and outputs the same to the PANet structure; and the fused feature map $P_1$, the fused feature map $P_2$ and fused feature map $P_3$ enter the PANet structure to output a feature map $A_1$, a feature map $A_2$ and a feature map $A_3$, respectively.

As an improvement of the above method, the method further includes a step of training the fusion model, specifically including:

building a training set;

setting hyperparameters, comprising: an initial learning rate lr=0.001, a batch value b=32 for each parameter update, an iterative training number epoch=300, and SGD for an optimizer;

setting loss functions, including: using a binary cross-entropy loss function for classification and a GIOU loss function as a regression loss function; and updating a learning rate and reducing the learning rate by using a cosine annealing strategy; and training parameters of the fusion model based on a nuScenes dataset and a self-collected road target dataset as well as set parameters.

Embodiment 2 of the present invention provides a computer device, including a memory, a processor, and a computer program stored in the memory and executable on the processor, wherein the processor, when executing the computer program, implements the above method.

Embodiment 3 of the present invention provides a computer readable storage medium, the computer readable storage medium storing a computer program which, when executed by a processor, causes the processor to execute the above method.

Compared with the prior art, the nosecones present invention has the following advantages:

1. The method of the present invention makes full use of distance, speed, reflection intensity and other information in millimeter wave radar data to achieve a more obvious effect of fusing the information with vehicle-mounted camera images.

2. The method of the present invention can nosecones use sequences to perform data complementation and enhancement on millimeter wave information so that the later fusion perception is more robust and stable.

3. The method of the present invention fully fuses millimeter wave radar echo intensity and distance information with the vehicle-mounted camera images. Not just indiscriminately fusing all information of the millimeter wave radar as additional features in the same way, it analyzes different features of a millimeter wave radar point cloud and fuses the features with image information by using different feature extraction structures and ways, so that the advantages of the two types of sensor data complement each other, which enhances the perception capability of a vehicle in complex road scenes and improves the accuracy of target detection.

BRIEF DESCRIPTION OF THE DRAWINGS

FIGURE is a schematic diagram of a fusion module of embodiment 1 of the present invention.

DETAILED DESCRIPTION OF THE EMBODIMENTS

To make the objectives, technical solutions and advantages of the present invention clearer and more apparent, the present invention will be further described in detail below in conjunction with the accompanying drawings and embodiments. It should be understood that the specific embodiments described herein are only used for explaining the present invention, rather than limiting the present invention.

In complex scenes, for the problem of low accuracy of target detection using only a vehicle-mounted camera or a millimeter wave radar, a novel idea is fusing information from multiple types of sensors to improve the ability of perceiving a road environment around a vehicle. A mainstream idea is performing target detection on a millimeter wave radar point cloud and a camera image respectively and then fusing detection results. This method does not take full advantage of an information complementary effect between the two types of sensor data. Another mainstream idea is mapping a millimeter wave radar point cloud to a camera image plane to generate a point cloud image, and fusing the image with various information such as velocity, direction, and reflection intensity provided by a millimeter wave radar. Such a method indiscriminately performs feature fusion on all millimeter wave point cloud information and image information, without considering unique attributes of different information, and without making full use of the complementarity of the two types of information. In the present invention, features of different information of a millimeter wave point cloud are analyzed, and different information is fused with image information in different manners, which makes full use of the complementarity of the two types of information.

Embodiment 1 of the present invention provides an all-weather target detection method based on vision and millimeter wave fusion, including the following steps:

Step 1) acquiring distance, speed, reflection intensity and other information by a millimeter wave radar, and acquiring video images by a vehicle-mounted camera.

Pre-processed complemented millimeter wave radar scattering points are projected to a corresponding visual plane, and lines are drawn based on three-dimensional information of the radar scattering points by extending 3 m upward from the ground, and reflection intensity and distance information is numerically represented, such that sparse point cloud information is transformed into more dense line clusters. Such a method for pre-processing a millimeter wave radar point cloud has been applied in researches of some scholars. The present invention just uses such similar preprocessing means, and a different fusion method as a key point.

Step 2) The millimeter wave radar information and camera image information are fused by a designed fusion model. A hardware and software platform for network construction, training, and testing is Ubuntu 16.04+NVIDIA RTX 2080 Ti+Pytorch1.5+cuda10.0+cudnn8.0+python3.7.

Designing steps of a fusion model are as follows:

1) As shown in FIGURE, a CSPDarkNet53 network is used as a feature extraction network for image information, and in each step, RGB images enter different feature extraction modules of the network for feature extraction, while features are extracted from radar information (RCS) by a convolutional layer to form feature tensors with the same size as image features, and then channel superimposition is performed on the two types of features to generate complementary semantic information; and then the information enters the next stage of the feature extraction module to extract features respectively, and after three stages of continuous fusion, final fused features enter an SPP structure to generate a feature pyramid.

2) The feature fusion includes three branches of output to carry out the next detection part, and feature maps from the It three branches of output are then fused with velocity and distance information, which is equivalent to an attention mechanism to enhance the learning of features in important regions of the space. Features of point clouds fed from targets at farther distances or with higher velocities have higher weights to improve detection precision for the targets at farther distances and with higher velocities. The fusion is carried out by pixel-by-pixel addition to enhance the learning of features in important regions of the space. Features of point clouds fed from targets at farther distances or with higher velocities have higher weights to enhance a detection effect for the targets at farther distances and with higher velocities. A detection algorithm of YOLOv5 is used in the detection part, and NMS (non-maximum suppression) is used to output a detection result effect map as a detection result.

The fusion model includes a feature extraction module and a feature fusion module;

the feature extraction module includes a first feature extraction channel, a second feature extraction channel and three feature stitching units; the first feature extraction channel extracts features from scattering cross-section intensity information of a radar point cloud by using three sequentially connected convolution units; and the second feature extraction channel extracts features from image data by using CSPDarkNet53 including three convolution units;

a first convolution unit of the first feature extraction channel processes the scattering cross-section intensity information of the point cloud data to obtain a first RCS feature and outputs the first RCS feature to a first stitching unit; a first convolution unit of the CSPDarkNet53 processes the image data to obtain a first visual feature and outputs the first visual feature to the first stitching unit; the first stitching unit stitches the first RCS feature and the first visual feature to generate a fused feature map F1 and outputs the same to the feature fusion module;

a second convolution unit of the first feature extraction channel processes the first RCS feature to obtain a second RCS feature and outputs the second RCS feature to a second stitching unit; a second convolution unit of the CSPDark-Net53 processes the first visual feature to obtain a second visual feature and outputs the second visual feature to the second stitching unit; the second stitching unit stitches the second RCS feature and the second visual feature to generate a fused feature map F2 and outputs the same to the feature fusion module;

a third convolution unit of the first feature extraction channel processes the second RCS feature to obtain a third RCS feature and outputs the third RCS feature to a third stitching unit; a third convolution unit of the CSPDarkNet53 processes the second visual feature to obtain a third visual feature and outputs the third visual feature to a third stitching unit; the third stitching unit processes the third RCS feature and the third visual feature to generate a fused feature map F3 and outputs the same to the feature fusion module;

the feature fusion module includes a third feature extraction channel, three fusion units and a PANet structure; the third feature extraction channel uses three sequentially connected convolution units;

a first convolution unit of the third feature extraction channel processes distance information and velocity information of the point cloud data to obtain a first point cloud feature and outputs the first point cloud feature to a first fusion unit; the first fusion unit performs pixel-level superimposition on the first point cloud feature and the fused feature map F1 to generate a fused feature map P1 and outputs the same to the PANet structure;

a second convolution unit of the third feature extraction channel processes the first point cloud feature to obtain a second point cloud feature and outputs the second point cloud feature to a second fusion unit; the second fusion unit performs pixel-level superimposition on the second point cloud feature and the fused feature map F2 to generate a fused feature map P2 and outputs the same to the PANet structure;

a third convolution unit of the third feature extraction channel processes the second point cloud feature to obtain a third point cloud feature and outputs the third point cloud feature to a third fusion unit; the third fusion unit performs pixel-level superimposition on the third point cloud feature and the fused feature map F3 to generate a fused feature map P3 and outputs the same to the PANet structure; and the fused feature map $P_1$, the fused feature map $P_2$ and fused feature map $P_3$ enter the PANet structure to output a feature map $A_1$, a feature map $A_2$ and a feature map $A_3$, respectively.

3) Main parameters of the fusion model in the training process are as follows:

(1) setting hyperparameters: an initial learning rate lr=0.001, a batch value b=32 for each parameter update, an iterative training number epoch=300, and SGD for an optimizer;

(2) setting loss functions including: using a binary cross-entropy loss function for classification and a GIoU loss function as a regression loss function; and (3) updating a learning rate and reducing the learning rate by using a cosine annealing strategy.

Embodiment 2 of the present invention may also provide a computer device, including a processor, a memory, at least one network interface and a user interface. Components of the device are coupled together via a bus system. It may be understood that the bus system is configured to implement connection and communication between these components. The bus system includes a power bus, a control bus, and a status signal bus in addition to a data bus. The user interface may include a display, a keyboard, or a clicking device (e.g., a mouse, a track ball, a touch pad, or a touch screen).

It may be understood that the memory in embodiments of the present disclosure may be a volatile memory or a non-volatile memory, or may include both a volatile memory and a non-volatile memory. The non-volatile memory may be a read-only memory (ROM), a programmable ROM (PROM), an erasable PROM (EPROM), an electrically EPROM (EEPROM) or a flash memory. The volatile memory may be random access memory (RAM), which is used as an external cache. By way of exemplary but not restrictive description, many forms of RAMs may be used, such as a static RAM (SRAM), a dynamic RAM (DRAM), a synchronous DRAM (SDRAM), a double data rate SDRAM (DDRSDRAM), an enhanced SDRAM (ES-DRAM), a Synchlink DRAM (SLDRAM), and a direct Rambus RAM (DRRAM). The memory described herein is intended to include, but is not limited to, these and any other suitable types of memory.

In some implementations, the memory stores the following elements, executable modules or data structures, or a subset thereof, or an extended set thereof: an operating system and an application.

The operating system contains various system programs, such as a framework layer, a core library layer, and a driver layer, for implementing various basic services and performing hardware-based tasks. The application contains various applications, such as a media player, and a browser, for implementing various application services. A program for implementing the method of embodiments of the present disclosure may be included in the application.

In the above embodiments, by calling a program or instructions stored in the memory, which may specifically be a program or instructions stored in the application, the processor is configured to executes the steps of the method of Embodiment 1.

The method of Embodiment 1 may be applied in the processor or implemented by the processor. The processor may be an integrated circuit chip with signal processing capability. During implementation, the steps of the above-mentioned method may be accomplished by an integrated logic circuit in the form of hardware or instructions in the form of software in the processor. The above-mentioned processor may be a general-purpose processor, a digital signal processor (DSP), an application specific integrated circuit (ASIC), a field programmable gate array (FPGA) or other programmable logic device, a discrete gate or transistor logic device, or a discrete hardware component. The various methods, steps and logical block diagrams disclosed in Embodiment 1 may be implemented or executed. The general-purpose processor may be a microprocessor, or the processor may also be any conventional processor or the like. The steps of the method disclosed in conjunction with Embodiment 1 may be directly embodied in hardware and executed by a decoding processor, or executed by a combination of hardware and software modules in a decoding processor. The software module may be in a storage medium mature in the art, such as a random memory, a flash memory, a read-only memory, a programmable read-only memory or electrically erasable programmable memory, or a register. The storage medium is in the memory, and the processor reads information in the memory and accomplishes the steps of the above-mentioned method in conjunction with hardware thereof.

It may be understood that these embodiments described in the present invention may be implemented with hardware, software, firmware, middleware, microcodes, or a combination thereof. For hardware implementation, the processing unit may be implemented in one or more application specific integrated circuits (ASICs), digital signal processors (DSPs), digital signal processing devices (DSP Devices, DSPDs), programmable logic devices (PLDs), field-programmable gate arrays (FPGAs), general-purpose processors, controllers, microprocessors, microcontrollers, other electronic units for performing the functions described in the present application, or a combination thereof.

For software implementation, the technology of the present invention may be implemented by executing functional modules (e.g. processes, and functions) of the present invention. Software codes may be stored in the memory and executed by the processor. The memory may be implemented in the processor or outside the processor.

Embodiment 3

Embodiment 3 of the present invention also provides a non-volatile storage medium configured to store a computer program. When the computer program is executed by the processor, the steps in the above method embodiment 1 may be implemented.

Finally, it should be noted that the above embodiments are only used for describing instead of limiting the technical solutions of the present invention. Although the present invention is described in detail with reference to the embodiments, persons of ordinary skill in the art should understand that modifications or equivalent substitutions of the technical solutions of the present invention should be encompassed within the scope of the claims of the present invention so long as they do not depart from the spirit and scope of the technical solutions of the present invention.

The invention claimed is:

1. An all-weather target detection method based on a vision and millimeter wave fusion, comprising:
   simultaneously acquiring continuous image data and point cloud data by using two types of sensors comprising a vehicle-mounted camera and a millimeter wave radar;
   pre-processing the image data and the point cloud data;
   fusing pre-processed image data and pre-processed point cloud data by using a pre-established fusion model, and outputting a fused feature map; and
   inputting the fused feature map into a YOLOv5 detection network for a detection, and outputting a target detection result by a non-maximum suppression;
   wherein the pre-established fusion model comprises a feature extraction module and a feature fusion module;
   the feature extraction module comprises a first feature extraction channel, a second feature extraction channel, and three feature stitching units; the first feature extraction channel extracts features of scattering cross-section intensity information of a radar point cloud by using three sequentially connected convolution units; and the second feature extraction channel extracts features of the pre-processed image data by using a CSPDarkNet53 comprising three convolution units;
   a first convolution unit of the first feature extraction channel processes the scattering cross-section intensity information of the pre-processed point cloud data to obtain a first radar cross section (RCS) feature, and outputs the first RCS feature to a first feature stitching unit; a first convolution unit of the CSPDarkNet53 processes the pre-processed image data to obtain a first visual feature, and outputs the first visual feature to the first feature stitching unit; the first feature stitching unit stitches the first RCS feature and the first visual feature to generate a first fused feature map and output the first fused feature map to the feature fusion module;
   a second convolution unit of the first feature extraction channel processes the first RCS feature to obtain a second RCS feature, and outputs the second RCS feature to a second feature stitching unit; a second convolution unit of the CSPDarkNet53 processes the first visual feature to obtain a second visual feature, and outputs the second visual feature to the second feature stitching unit; the second feature stitching unit stitches the second RCS feature and the second visual feature to generate a second fused feature map and output the second fused feature map to the feature fusion module;

a third convolution unit of the first feature extraction channel processes the second RCS feature to obtain a third RCS feature, and outputs the third RCS feature to a third feature stitching unit; a third convolution unit of the CSPDarkNet53 processes the second visual feature to obtain a third visual feature, and outputs the third visual feature to a third feature stitching unit; the third feature stitching unit processes the third RCS feature and the third visual feature to generate a third fused feature map and output the third fused feature map to the feature fusion module;

the feature fusion module comprises a third feature extraction channel, three fusion units, and a PANet structure; the third feature extraction channel configures three sequentially connected convolution units;

a first convolution unit of the third feature extraction channel processes distance information of the pre-processed point cloud data and velocity information of the pre-processed point cloud data to obtain a first point cloud feature, and outputs the first point cloud feature to a first fusion unit; the first fusion unit performs a pixel-level superimposition on the first point cloud feature and the first fused feature map to generate a fourth fused feature map and output the fourth fused feature map to the PANet structure;

a second convolution unit of the third feature extraction channel processes the first point cloud feature to obtain a second point cloud feature, and outputs the second point cloud feature to a second fusion unit; the second fusion unit performs the pixel-level superimposition on the second point cloud feature and the second fused feature map to generate a fifth fused feature map and output the fifth fused feature map to the PANet structure;

a third convolution unit of the third feature extraction channel processes the second point cloud feature to obtain a third point cloud feature, and outputs the third point cloud feature to a third fusion unit; the third fusion unit performs the pixel-level superimposition on the third point cloud feature and the third fused feature map to generate a sixth fused feature map and output the sixth fused feature map to the PANet structure; and the fourth fused feature map, the fifth fused feature map and the sixth fused feature map pass through the PANet structure to output a first feature map, a second feature map and a third feature map respectively.

2. The all-weather target detection method based on the vision and millimeter wave fusion according to claim 1, further comprising: performing a coordinate system calibration on coordinate systems of the two types of sensors.

3. The all-weather target detection method based on the vision and millimeter wave fusion according to claim 1, wherein the step of pre-processing the image data and the point cloud data comprises: complementing the point cloud data of the millimeter wave radar; and complementing the image data of the vehicle-mounted camera.

4. The all-weather target detection method based on the vision and millimeter wave fusion according to claim 3, further comprising training steps of the pre-established fusion model, the training steps comprises building a training set;
setting hyperparameters, comprising: an initial learning rate lr=0.001, a batch value for each parameter update b=32, an iterative training number epoch=300, and a stochastic gradient descent (SGD) for an optimizer;
setting loss functions, comprising: adopting a binary cross-entropy loss function for a classification, and adopting a generalized intersection over union (GIOU) loss function for a regression loss function; and updating a learning rate, and reducing the learning rate by using a cosine annealing strategy; and
training parameters of the pre-established fusion model based on a nuScenes dataset and a self-collected road target dataset as well as set parameters.

5. A computer device, comprising a memory, a processor, and a computer program stored in the memory and operable on the processor, wherein when executing the computer program, the processor implements the method according to claim 1.

6. A non-transitory computer readable storage medium, wherein the computer readable storage medium stores a computer program, and when the computer program is executed by a processor, the processor executes the method according to claim 1.

7. The computer device according to claim 5, wherein the all-weather target detection method further comprises: performing a coordinate system calibration on coordinate systems of the two types of sensors.

8. The computer device according to claim 5, wherein the step of pre-processing the image data and the point cloud data comprises: complementing the point cloud data of the millimeter wave radar; and complementing the image data of the vehicle-mounted camera.

9. The computer device according to claim 8, wherein the method further comprises training steps of the pre-established fusion model, the training steps comprises building a training set;
setting hyperparameters, comprising: an initial learning rate lr=0.001, a batch value for each parameter update b=32, an iterative training number epoch=300, and a stochastic gradient descent (SGD) for an optimizer;
setting loss functions, comprising: adopting a binary cross-entropy loss function for a classification, and adopting a generalized intersection over union (GIOU) loss function for a regression loss function; and updating a learning rate, and reducing the learning rate by using a cosine annealing strategy; and
training parameters of the pre-established fusion model based on a nuScenes dataset and a self-collected road target dataset as well as set parameters.

10. The non-transitory computer readable storage medium according to claim 6, wherein the all-weather target detection method further comprises: performing a coordinate system calibration on coordinate systems of the two types of sensors.

11. The non-transitory computer readable storage medium according to claim 6, wherein the step of pre-processing the image data and the point cloud data comprises: complementing the point cloud data of the millimeter wave radar; and complementing the image data of the vehicle-mounted camera.

12. The non-transitory computer readable storage medium according to claim 11, wherein the method further comprises training steps of the pre-established fusion model, the training steps comprises building a training set;

setting hyperparameters, comprising: an initial learning rate lr=0.001, a batch value for each parameter update b=32, an iterative training number epoch=300, and a stochastic gradient descent (SGD) for an optimizer;

setting loss functions, comprising: adopting a binary cross-entropy loss function for a classification, and adopting a generalized intersection over union (GIOU) loss function for a regression loss function; and updating a learning rate, and reducing the learning rate by using a cosine annealing strategy; and training parameters of the pre-established fusion model based on a nuScenes dataset and a self-collected road target dataset as well as set parameters.

* * * * *